US008641881B2

(12) United States Patent
Park et al.

(10) Patent No.: US 8,641,881 B2
(45) Date of Patent: Feb. 4, 2014

(54) DIELECTROPHORESIS APPARATUS INCLUDING CONCENTRATION GRADIENT GENERATING UNIT, METHOD OF SEPARATING MATERIAL USING THE SAME, AND METHOD OF SCREENING CONDITION FOR SEPARATING MATERIAL

(75) Inventors: Chin-sung Park, Yongin-si (KR); Yoon-kyoung Cho, Suwon-si (KR); Sook-young Kim, Yongin-si (KR); Min-ae Jung, Gwangju-si (KR); Jin-tae Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 420 days.

(21) Appl. No.: 12/862,114

(22) Filed: Aug. 24, 2010

(65) Prior Publication Data

US 2011/0089034 A1 Apr. 21, 2011

Related U.S. Application Data

(62) Division of application No. 11/337,386, filed on Jan. 23, 2006, now Pat. No. 7,828,950.

(30) Foreign Application Priority Data

Jan. 21, 2005 (KR) ........................ 10-2005-0005812

(51) Int. Cl.
*B01D 57/02* (2006.01)
*G01N 27/447* (2006.01)

(52) U.S. Cl.
USPC ........................................... 204/547; 204/643

(58) Field of Classification Search
USPC ....................... 435/288.5; 204/193, 409, 412, 204/450–452, 490, 547, 600, 643; 422/99, 422/100, 70; 209/128, 158
See application file for complete search history.

(56) References Cited

U.S. PATENT DOCUMENTS

| | | | | |
|---|---|---|---|---|
| 4,375,401 | A | 3/1983 | Catsimpoolas | |
| 5,569,367 | A | 10/1996 | Betts et al. | |
| 6,071,394 | A | 6/2000 | Cheng et al. | |
| 6,149,789 | A | 11/2000 | Benecke et al. | |
| 6,306,659 | B1 * | 10/2001 | Parce et al. | ..................... 436/47 |
| 6,352,838 | B1 | 3/2002 | Krulevitch et al. | |
| 6,686,842 | B1 | 2/2004 | Afilani | |
| 2002/0182654 | A1 | 12/2002 | Jing et al. | |
| 2004/0026250 | A1 | 2/2004 | Cummings et al. | |

FOREIGN PATENT DOCUMENTS

| | | | |
|---|---|---|---|
| KR | 10-1992-0701792 | | 12/1998 |
| KR | 10-2000-0036079 | A | 6/2000 |
| KR | 20000036079 | A | 6/2000 |
| WO | 9810869 | A1 | 3/1998 |

OTHER PUBLICATIONS

Chia-Fu Chou et al., "Electrodeless Dielectrophoresis for Micro Total Analysis Systems", IEEE Engineering in Medicine and Biology Magazine, Nov./Dec. 2003, vol. 22, Issue 6, pp. 62-67.

(Continued)

*Primary Examiner* — J. Christopher Ball
(74) *Attorney, Agent, or Firm* — Cantor Colburn LLP

(57) ABSTRACT

A dielectrophoresis (DEP) apparatus including a concentration gradient generating unit, a method of separating a target material in a sample solution using the DEP apparatus, and a method of screening the optimum condition for separating a target material are provided.

14 Claims, 17 Drawing Sheets

(56) References Cited

OTHER PUBLICATIONS

Darren S Gray et al., "Dielectrophoretic registration of living cells to a microelectrode array", Elsevier, Biosensors & Bioelectronics 19 (2004) 1765-1774.
Francis Lin et al., "Generation of dynamic temporal and spatial concentration gradients using microfuidic devices", Lab Chip, 2004, 4, 164-167.
Haibo Li et al., "Dielectrophoretic separation and manipulation of live and heat-treated cells of Listeria on microfabricated devices with interdigitated electrodes", Elsevier, Sensors and Actuators B 86 (2002) 215-221.
Pikul Wanichapichart et al., "Determination of Cell Dielectric Properties Using Dielectrophoretic Technique", ScienceAsia 28 (2002): 113-119.

* cited by examiner

A B C D

A B C D

E F G H

DIELECTROPHORESIS APPARATUS INCLUDING CONCENTRATION GRADIENT GENERATING UNIT, METHOD OF SEPARATING MATERIAL USING THE SAME, AND METHOD OF SCREENING CONDITION FOR SEPARATING MATERIAL

CROSS REFERENCE TO RELATED APPLICATIONS

This application is a divisional application of U.S. patent application Ser. No. 11/337,386 filed Jan. 23, 2006, which claims the priority of Korean Patent Application No. 10-2005-0005812, filed on Jan. 21, 2005 in the Korean Intellectual Property Office, the disclosure of which is incorporated herein in its entirety by reference.

BACKGROUND OF THE INVENTION

1. Field of the Invention

The present invention relates to an apparatus for separating a target material from a sample solution using dielectrophoresis (DEP), and a method of separating a target material and a method of screening an optimum condition for separating a target material using the apparatus.

2. Description of the Related Art

It is well known that a dielectrophoretic force exerts on dielectrically polarizable particles in an non-uniform electric field when effective polarizability of the particles are different from a polarizability of an adjacent medium even if the particles are not charged. The movement of the particles is not determined by the charges of the particles, as is well known in electrophoresis, but is determined by dielectric characteristics (e.g., conductivity and permittivity) of the particles.

The dielectrophoretic force exerting on the particles can be given by:

$$F_{DEP} = 2\pi a^3 \varepsilon_m \mathrm{Re}\left(\frac{\varepsilon_p - \varepsilon_m}{\varepsilon_p + 2\varepsilon_m}\right)\nabla E^2 \tag{1}$$

where, $F_{EDP}$ denotes dielectrophoretic force exerting on a particle, a denotes the diameter of the particle, $\in_m$ denotes permittivity of a medium, $\in_p$ denotes permittivity of the particle, Re denotes a real part, E denotes an electric field, and ∇ denotes a del vector operation. As in Equation 1, the dielectrophoretic force is proportional to the volume of the particle, the difference between the permittivity of the medium and the particle, and the square of the strength of the electric field.

$$f = \left[\frac{\tilde{\sigma}_p - \tilde{\sigma}_m}{\tilde{\sigma}_p + 2\tilde{\sigma}_m}\right] \tag{2}$$

where f denotes a Clausius-Mossotti (CM) factor, and $\tilde{\sigma}_p$ and $\tilde{\sigma}_m$ denote composite conductivities of a particle and a medium, respectively. When f>0, positive dielectrophoresis (DEP) is generated and the particle is attracted to a region with a high electric field gradient. When f<0, negative DEP is generated and the particle is attracted to a region with a small electric field gradient.

As shown in Equations 1 and 2, the dielectrophoretic force exerting on the particle can differ depending on the conductivity of the medium, frequency and voltage of the alternating voltage.

An example of a conventional apparatus for separating materials by DEP is disclosed in U.S. Pat. No. 5,569,367 entitled "Apparatus for Separating a Mixture." The apparatus for separating the mixture by a delay in flow of particles includes a chamber having an inlet and an outlet, an electrode structure installed in the chamber, and a means for applying an alternating voltage. However, the apparatus is for separating a target material using a means which provides a spatially nonhomogeneous alternating electric field in a path along which the target material to be separated flows.

Therefore, in the conventional apparatus, a separating test needs to be repeatedly performed to obtain an optimum conductance value, and voltage and frequency of the current at which the target material is separated. The inventors of the present invention have found that the above-described problem can be solved using a concentration gradient generating unit of an electrolyte while researching into an apparatus that can be used to determine an optimum conductance, and voltage and frequency conditions at which a target material is separated through a single test, and completed the present invention.

SUMMARY OF THE INVENTION

The present invention provides an apparatus for separating a target material using dielectrophoresis (DEP) that can be used to screen an optimum condition for separating a target material using DEP.

The present invention also provides a method of screening an optimum condition for separating a target material using the apparatus.

The present invention also provides a method of separating a target material using the apparatus.

According to an aspect of the present invention, there is provided an apparatus for separating a material or screening a material separating condition by dielectrophoresis, the apparatus comprising: a concentration gradient generating unit formed of a microchannel network; and a material separating unit which is connected to the concentration gradient generating unit and includes a plurality of electrodes.

The apparatus may comprise: first and second inlets connected to a concentration gradient generating unit; a concentration gradient generating unit formed of a microchannel network; a material separation unit which is connected to the concentration gradient generating unit; an outlet connected to the material separation unit; and an element for inducing a fluidic flow between the first and second inlets and the outlet, wherein the concentration gradient generating unit includes microchannels connected to the first and second inlets, the microchannels including first and second injection microchannels, a distribution microchannel, first and second flow channels, and at least one mixing channel, wherein the first and second injection microchannels respectively connect the first and second inlets to the distribution microchannel, the first injection microchannel is connected to the distribution microchannel between the first flow channel and a mixing channel nearest to the first flow channel, the second injection microchannel is connected to the distribution microchannel between the second flow channel and a mixing channel nearest to the second flow channel, the distribution microchannel is arranged substantially perpendicular to a direction in which a fluid flows, the first and second flow channels are connected to the distribution microchannel, fluids injected through the first and second inlets flow through the first and second flow channels, respectively, not to be mixed together, the mixing channel is connected to the distribution microchannel, and the fluids injected through the first and second inlets are mixed in the mixing channel. The material separating unit is a chamber formed by converging the first and second flow channels and the mixing channel and includes at least two electrodes, an element for supplying alternating current to the electrodes, and a detector, wherein the electrodes generate a spatially nonhomogeneous electric field in the chamber when an alternating current is supplied between the electrodes, thereby separating a target material from the sample solution by dielectrophoresis.

In the apparatus according to the present invention, the concentration generating unit is formed as a microchannel network including microchannels connected to the first and second inlets. When electrolytes with different concentrations are injected into the microchannel network through the first and second inlets to induce a fluidic flow in the microchannel network, the concentration gradients of the electrolytes are generated substantially perpendicular to a direction in which the fluid flows. The microchannel network used to generate such concentration gradients is well known to one of ordinary skill in the art to which the present invention pertains, and a microchannel network in any shape can be used in the apparatus according to the present invention.

According to the present invention, the concentration gradient generating unit includes first and second injection microchannels, a distribution microchannel, first and second flow channels, and at least one mixing channel, wherein the first and second injection microchannels respectively connect the first and second inlets to the distribution microchannel, the first injection microchannel is connected to the distribution microchannel between the first flow channel and a mixing channel nearest to the first flow channel, the second injection microchannel is connected to the distribution microchannel between the second flow channel and a mixing channel nearest to the second flow channel, the distribution microchannel is arranged substantially perpendicular to a direction in which a fluid flows, the first and second flow channels are connected to the distribution microchannel, fluids injected through the first and second inlets flow through the first and second flow channels, respectively, not to be mixed together, the mixing channel is connected to the distribution microchannel, and the fluids injected through the first and second inlets are mixed in the mixing channel. The first and second flow channels and the mixing channels are connected to the distribution microchannel in a direction substantially parallel to the net direction in which the fluid flows.

When first and second fluidic solutions containing electrolytes with different concentrations are injected through the first and second inlets according to the present invention to induce a fluidic flow, a predetermined concentration gradient is generated in the fluid discharged through the first flow channel, the mixing channel, and the second flow channel, after passing through the microchannels of the concentration gradient generating unit. For example, when an electrolyte with a low concentration and an electrolyte with a high concentration are respectively injected into the first and second inlets and flow toward the outlet via the microchannels, the electrolyte with low concentration flows through the first flow channel, an electrolyte with a medium concentration obtained as the electrolytes with high and low concentrations are mixed together flows through the mixing channel, and the electrolyte with high concentration flows through the second flow channel. Consequently, the fluid discharged from the first flow channel, the mixing channel, and the second flow channel has a high concentration gradient corresponding to the concentrations of the electrolytes. The concentration gradient of the electrolyte can also induce a conductance gradient, and thus the concentration gradient of the electrolyte can be interchangeably used with the conductance gradient. According to the apparatus of the present invention, the concentration gradient generated in the concentration gradient generating unit is not limited to the concentration gradient described above. An electrolyte with a higher concentration may be injected into the first inlet and an electrolyte with a lower concentration gradient may be injected into the second inlet to generate an inverse concentration gradient.

In the present invention, the first and second flow channels may be shaped in a linear or bent (i.e., zigzag) form. Also, the mixing channel may be shaped in a form in which a laminar flow of the electrolytes with different concentrations mixed in the distribution channel can be thoroughly mixed. The mixing channel may be shaped in a bent (i.e., zigzag) form.

According to the present invention, the concentration gradient generating unit may include a plurality of distribution microchannels to which first and second flow channels and mixing channels are connected in series. In other words, the concentration gradient generating unit may be a microchannel network including a plurality of units connected in series, each unit including a distribution microchannel connected to first and second flow channels and mixing channels.

In the apparatus according to the present invention, the material separating unit is a chamber formed by converging the first and second flow channels and the mixing channel and includes at least two electrodes, an element for supplying alternating current to the electrodes, and a detector, wherein the electrodes generate a spatially nonhomogeneous electric field in the chamber when an alternating current is supplied between the electrodes, thereby separating a target material from the sample solution by dielectrophoresis. The electrodes may be arranged in any structure as long as they are arranged to be able to generate a spatially nonhomogeneous electric field in the material separating unit when an AC voltage is applied between the electrodes. For example, the electrodes may be interdigitatedly arranged at regular intervals (e.g., tens of micrometers) in a direction substantially perpendicular to the direction in which the fluid flows. The electrodes may be, for example, aluminum, platinum, or gold coated chromium electrodes. Such an electrode structure may be formed using various techniques well known in the art. For example, the electrode structure may be formed in a chamber or a microchannel using photolithography. The electrodes may be arranged at various intervals depending on the dimension of a target material (e.g., 2 μm for *E. coli,* 10 μm for yeast) to be separated. In general, when separating bacteria having a dimension of 0.5 μm, an electrode structure with a small electrode interval of, for example, 5 μm, is appropriate. However, it should be considered that a circuit may be short-circuited or the electrodes may be cut.

The detector is used to detect a target material to be separated in a region in which the electrodes are arranged. The detector may be any signal detector known to one of ordinary skill in the art to which the present invention pertains. For example, the detector may be one selected from the group consisting of a microscope, an optical detector, and a CCD camera. The detector can be arranged in any region of the material separating unit, for example, such as to detect a signal originating from the region in which the electrodes are arranged.

In the present invention, the chamber or the channels may be made of, but not limited to, a transparent material including polydimethylsiloxane (PDMS).

Throughout the specification of the present invention, the term "channel" refers to a microchannel, unless indicated otherwise. The channel may have, but not limited to, a diameter of 1 μm to 1 mm. The cross-section of the channel may be circular, rectangular, and so on.

In the apparatus of the present invention, the element for inducing a fluidic flow between the inlets and the outlet may be any common element known to one of ordinary skill in the art, such as a pump. Alternatively, the fluidic flow may be induced by gravity.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
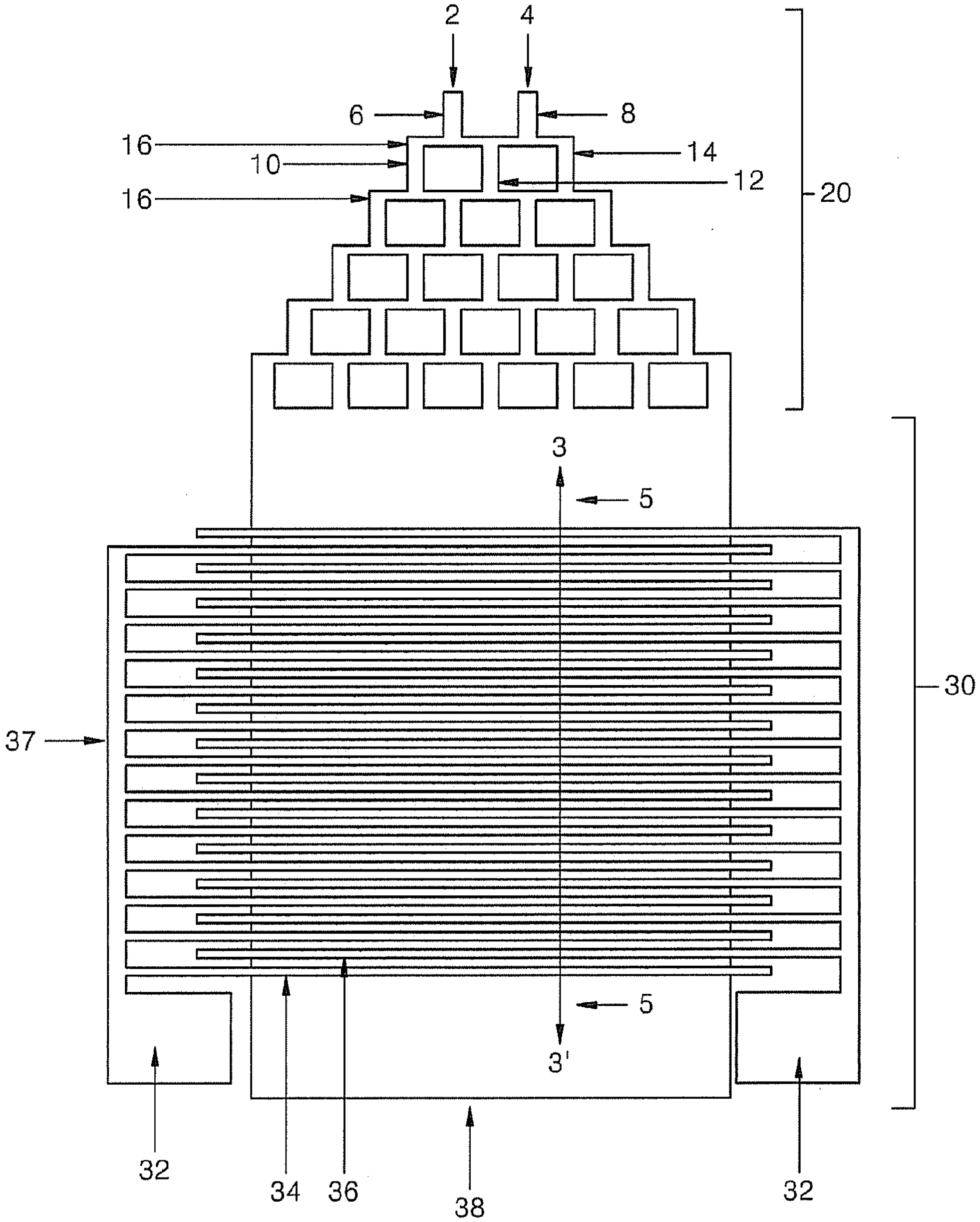
FIG. 1 is a diagram illustrating an apparatus for separating a target material using dielectrophoresis (DEP) according to an embodiment of the present invention.

FIG. 1 is a diagram illustrating an apparatus for separating a target material using dielectrophoresis (DEP) according to an embodiment of the present invention. The apparatus includes a first inlet 2, a second inlet 4, a concentration gradient generating unit 20 formed of a microchannel network, and a material separating unit 30 connected with the concentration gradient generating unit 20. The microchannel network includes a plurality of distribution channels 16 disposed substantially perpendicular to a direction in which a fluid flows; injection channels 6 and 8 which are respectively connected between the first inlet 2 and the distribution channel 16 and the second inlet 4 and the distribution channels 16; and first flow channels 10, mixing channels 12, and second flow channels 14 which connect between the distributions channels 16, or between the distribution channels 16 and the material separating unit 30.

The material separating unit 30 includes electrodes 34 and 36 disposed on the bottom of a chamber, alternating power supplies 32 which supply alternating power to the electrodes 34 and 36, and a detector (not shown). The electrodes 34 and 36 extend from a connection tap 37 disposed opposite to the chamber to be interdigitated parallel to one another. Fractions of a sample solution that have passed through the concentration gradient generating unit 20 and the material separating unit 30 are separately discharged through an outlet 38.

Figure 2:
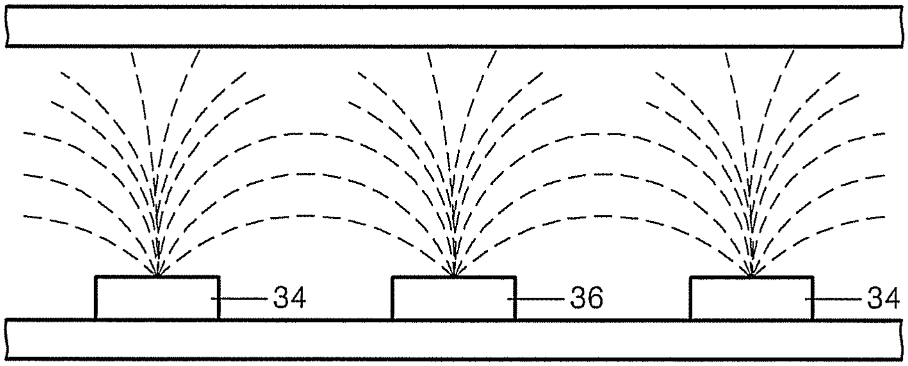
FIG. 2 is a cross-sectional view of the apparatus taken along line 3-3' in FIG. 1 seen from a direction indicated by arrows labeled with reference numeral 5.

FIG. 2 is a cross-sectional view of the apparatus taken along line 3-3' in FIG. 1 seen from a direction indicated by arrows labeled with reference numeral 5. As illustrated in FIG. 2, the electrodes 34 and 36 are disposed parallel to each other at regular intervals on the bottom of the chamber. When an alternating voltage is applied between the electrodes 34 and 36, a spatially nonhomogeneous electric field is generated as illustrated by dotted lines in FIG. 2.

The structure of the electrodes 34 and 36 illustrated in FIGS. 1 and 2 may be any structure in which a spatially nonhomogeneous electric field is generated as an alternating voltage is applied between the electrodes 34 and 36. Also, the shapes and structures of the components of the apparatus illustrated in FIGS. 1 and 2 are only exemplary and can be changed within the scope of the present invention by one skilled in the art to which the present invention pertains. For example, the connection tab 37 may be installed in the material separating unit 30.

Figure 3:
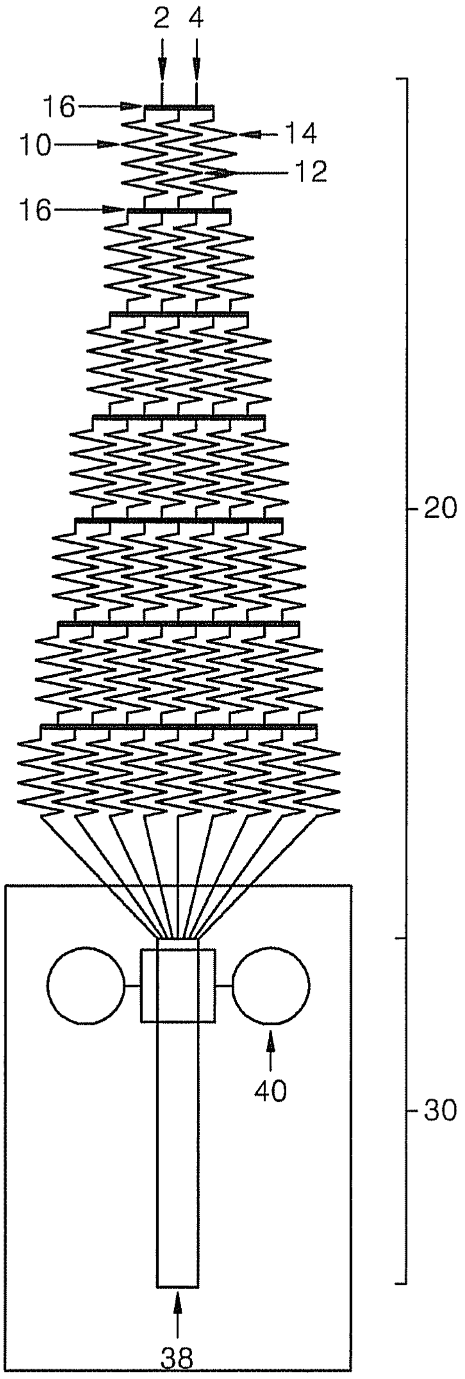
FIGS. 3 through 5 are diagrams illustrating an apparatus for separating a target material using DEP according to another embodiment of the present invention.

FIG. 3 is a diagram illustrating an apparatus for separating a target material using DEP according to an embodiment of the present invention. The apparatus includes distribution channels 16, and other channels connecting the distribution channels, i.e., first flow channels 10, mixing channels 12, and second flow channels 14, which are shaped in zigzag along the net flow direction of a fluid to allow laminar flows to be easily mixed. Other reference numerals in FIG. 3 that are illustrated in FIGS. 1 and 2 refer to the same elements. Reference numeral 40 denotes a detector.

According to an embodiment of the present invention, the apparatus may further include a third inlet and a fourth inlet. The first inlet 2 and the third inlet may be connected to the distribution channel 16 via channels which converge into a single channel and then connected to the distribution channels 16. The second inlet and the fourth inlet may be connected to the distribution channel 16 via channels which converge into a single channel and then connected to the distribution channel 16.

Figure 4A:
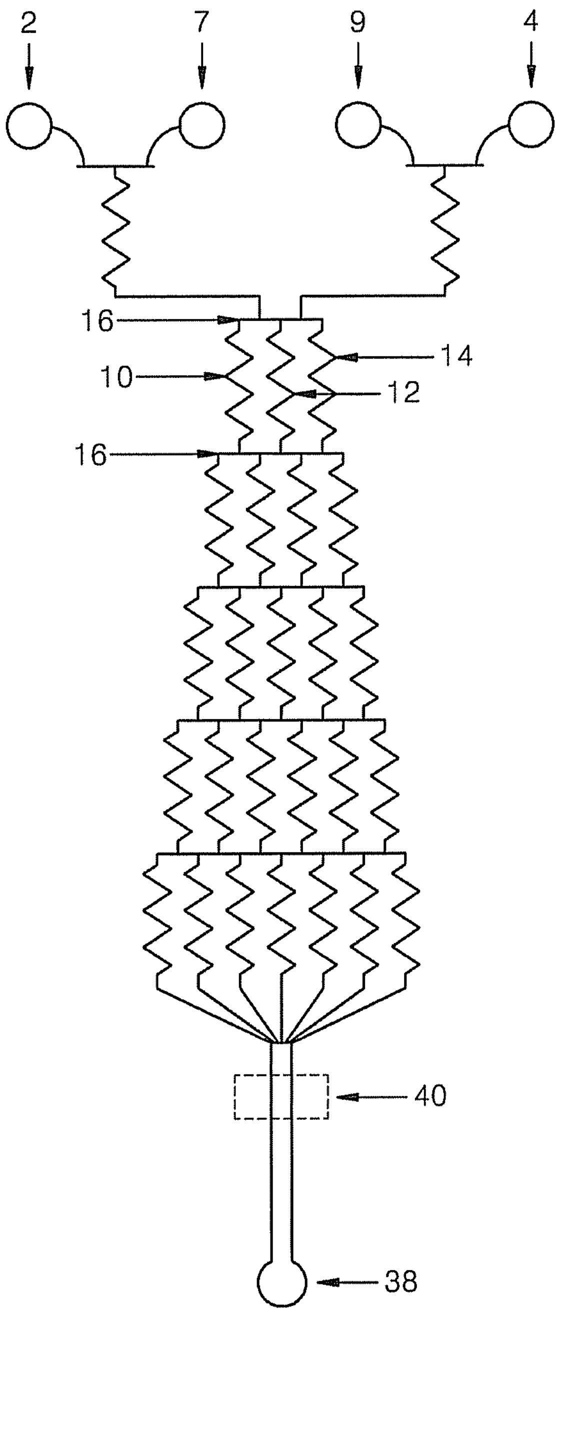

FIG. 4A is a diagram illustrating an apparatus for separating a target material using DEP according to an embodiment of the present invention in which a first inlet 2 and a third inlet 7, and a second inlet 4 and a fourth inlet 9 converge into single channels and then connected to distribution channels 16. The first inlet 2 and the third inlet 7 are connected to the distribution channel 16 between a first flow channel 10 and a mixing channel 12, and the second inlet 4 and the fourth inlet 9 are connected to the distribution channel 16 between the mixing channel 12 and a second flow channel 10. The apparatus illustrated in FIG. 4A can control the concentration of an electrolyte injected into a concentration gradient generating unit by controlling the concentration of an electrolyte of a fluid injected into first, second, third, and fourth inlets 2, 4, 7, and 9.

According to another embodiment of the present invention, the apparatus may further include at least one inlet. The inlet may be connected to the distribution channel 16 between the mixing channels 12 via a channel.

According to another embodiment of the present invention, the apparatus may further include at least two inlets. The inlets may be connected to the distribution channel 16 via inlet microchannels which at least two of the inlets microchannels converge into a single channel connected to the distribution channel 16 between the mixing channels.

Figure 4B:
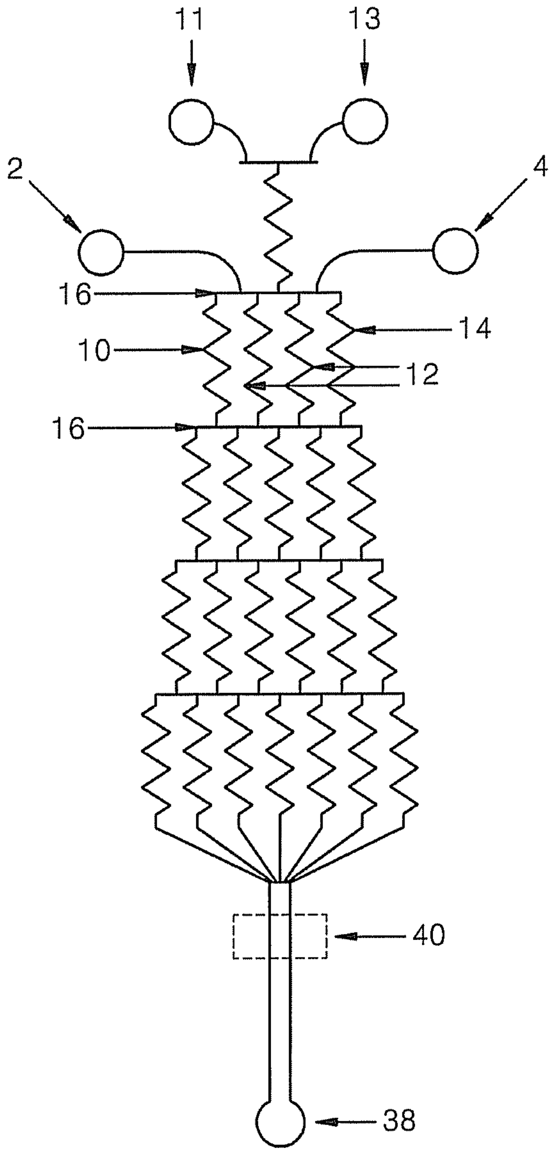

FIG. 4B is a diagram illustrating an apparatus for separating a target material using DEP according to another embodiment of the present invention. As illustrated in FIG. 4B, the apparatus may further include two inlets 11 and 13 connected to one of the distribution channels 16 via a channel, in addition to the first inlet 2 and the second inlet 4.

According to another embodiment of the present invention, the apparatus may include the first inlet 2, or the second inlet 4, or the first and second inlets 2 and 4 connected to one of the distribution channels 16 via channels. At least one of the channels may branch off into a plurality of channels, which are connected to the distribution channels 16 at different locations.

Figure 4C:
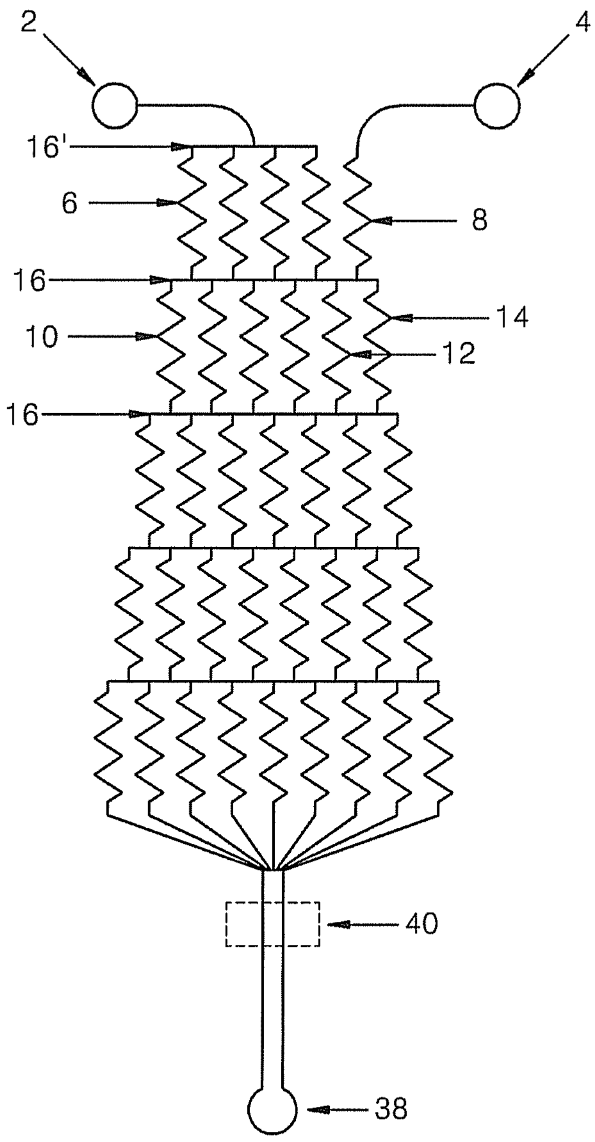

FIG. 4C is a diagram illustrating an apparatus for separating a target material using DEP according to another embodiment of the present invention. As illustrated in FIG. 4C, the apparatus includes a first inlet 2 connected to one of the injection distribution channels 16' via an injection channel, and four channels 6 branched off from the injection distribution channel 16' connected to the next distribution channel 16, and a second inlet 4 connected to the distribution channel 16 via another injection channel. Although, the first inlet 2 branches off into four channels 6 from the injection distribution channel 16' in the present embodiment, the apparatus is not limited to having such a structure. In fact, the channel may directly branch off into a plurality of channels connected to the second distribution channel 16.

The apparatus described above can be used to separate a target material from a sample solution and to screen an optimum condition required for separating the target material. The apparatus generates a spatially nonhomogeneous electric field in a sample solution in an electrolyte with a concentration gradient (i.e., a conductance gradient) to selectively induce a delay in flow of the target material, thereby separating the target material from the sample solution. Therefore, in the apparatus according to the present invention, the target material can be separated under various conductance conditions, so that the optimum conductance condition also can be screened. In addition, the apparatus can determine a conductance condition as described above, and can determine the optimum alternating voltage and frequency required for separating a target material because it can operate at various AC voltages and frequencies.

The preset invention also provides a method of screening an optimum condition for separating a target material from a sample solution by DEP using any one of the apparatuses described above. The method includes: injecting a sample solution into at least one inlet and inducing a flow from the inlet toward an outlet 38 to generate a conductance gradient in the material separating unit 30 in a direction substantially perpendicular to a direction in which the fluid flows; generating a spatially nonhomogeneous electric field in the material separating unit 30 by applying an alternating voltage output from the alternating power supply 32 between the electrodes 34 and 36 to selectively delay the flow of the target material contained in the sample solution; and detecting the location of the target material which is flow-delayed using the detector 40.

In the method according to the present invention, the target material may be labeled with a detectable labeling material. The labeling material may be, but not limited to, a radioactive material or a fluorescent material.

As described above, the method according to the present invention includes injecting of a sample solution, preferably with different conductance into at least one inlet and inducing a flow from the inlet toward the outlet 38 to generate a conductance gradient in the material separating unit 30 in a direction substantially perpendicular to a direction in which the fluid flows. The sample solution with different conductances may be prepared by, for example, respectively adding electrolytes (e.g., NaCl) with different concentrations to the sample solution containing the target material. The flow of the fluid may be induced by any element, such as a pump or gravity, well known to one skilled in the art to which the present invention pertains. One skilled in the art may generate any concentration gradient by arbitrarily combining the sample solution with different conductances injected into the first and second inlets 2 and 4.

As described above, the method according to the present invention includes generating of a spatially nonhomogeneous electric field in the material separating unit 30 to selectively delay the flow of the target material contained in the sample solution.

In DEP, a material, even if it is uncharged, moves in a certain direction in a nonhomogeneous electric field. When the target material is a positive DEP material, the target material adsorbs onto the electrodes 34 or 36. When the target material is a negative DEP material, the target material is trapped between the electrodes 34 and 36. Therefore, the movement of the target material that adsorbs onto the electrodes 34 or 36 or be trapped between the electrodes 34 or 36 by DEP is delayed further than other materials, so that the target material can be separated from the other materials.

As described above, the method according to the present invention includes determining the location of the target material which is flow-delayed. When the target material is a positive DEP material, the location of the target material which is flow-delayed can be identified by detecting a region in which the target material is adsorbed onto the electrodes using the detector, for example, a microscope or a CCD camera. The optimum conductance and AC frequency conditions for separating the target material can be determined by determining the concentration or conductance of the electrolyte, i.e., sample solution using the location information. Similarly, when the target material is a negative DEP material, the location of the target material can be identified by detecting a region in which the target material is trapped between the electrodes.

The apparatus of the present invention may also be used to separate a target material, in addition to determine the appropriate conductance and AC frequency conditions for separating a target material.

Therefore, the present invention also provides a method of separating a target material from a sample solution by DEP using any one of the apparatuses of the present invention described above. The method includes: injecting a sample solution containing a target material into at least one inlet and inducing a flow from the inlet toward an outlet 38 to generate a conductance gradient in the material separating unit 30 in a direction substantially perpendicular to a direction in which the fluid flows; generating a spatially nonhomogeneous electric field in the material separating unit 30 by applying an alternating voltage from the alternating power supply 32 between the electrodes 34 and 36 to selectively delay the flow of the target material contained in the sample solution; and discharging the target material which is flow-delayed, thereby separating the target material.

In the method of separating of a target material, the target material may be labeled with a detectable labeling material.

In the method of separating a target material, the target material may be separated from the sample solution using the apparatus according to the present invention under the conditions preset using the method of screening the optimum condition for separating a target material using DEP described above.

The present invention also provides an apparatus for separating a target material in a sample solution, the apparatus including: a first inlet and a second inlets connected to the concentration gradient generating unit; a concentration gradient generating unit formed of microchannel network; a material separating unit including microchannels which is connected to the microchannels of the concentration gradient generating unit; an outlet connected to the material separating unit; and an element for inducing a fluidic flow between the first and second inlets and the outlet.

The microchannels of the concentration gradient generating unit include first and second injection microchannels, a distribution microchannel, first and second flow channels, and at least one mixing channel, wherein the first and second injection microchannels respectively connect the first and second inlets to the distribution microchannel, the first injection microchannel is connected to the distribution microchannel between the first flow channel and a mixing channel nearest to the first flow channel, the second injection microchannel is connected to the distribution microchannel between the second flow channel and a mixing channel nearest to the second flow channel, the distribution microchannel is arranged substantially perpendicular to a direction in which a fluid flows, the first and second flow channels are connected to the distribution microchannel, fluids injected through the first and second inlets flow through the first and second flow channels, respectively, not to be mixed together, the mixing channel is connected to the distribution microchannel, and the fluids injected through the first and second inlets are mixed in the mixing channel.

The material separating unit includes channels extending from the first and second flow channels and the mixing channel and at least two electrodes in each of the channels and an element for supplying alternating current to the electrodes, wherein the electrodes generate a spatially nonhomogeneous electric field in each of the channels when an alternating current is supplied between the electrodes, thereby separating a target material from the sample solution by dielectrophoresis.

In the apparatus according to the present invention described above, the concentration gradient generating unit and the element for inducing a fluidic flow between the first and second inlets and the outlet are the same as those described in previous embodiments. Therefore, the various structures of the concentration gradient generating units illustrated in FIGS. 4A through 4C can apply in the apparatus of the present embodiment.

In the apparatus of the present embodiment, the material separating unit has a structure including channels extending from the first and second flow channels and the mixing channel of the concentration gradient generating unit and at least two electrodes in each of the channels and an element for supplying alternating current to the electrodes, wherein the electrodes generate a spatially nonhomogeneous electric field in each of the channels when an alternating current is supplied between the electrodes, thereby separating a target material from the sample solution by dielectrophoresis when the target material passes the electrodes. In the material separating unit, the electrodes may have an arbitrary array structure as long as a spatially nonhomogeneous electric field can be generated as an AC voltage is applied between at least two electrodes. For examples, the electrodes may be interdigitatedly disposed at regular intervals (e.g., tens of micrometers) in a direction substantially perpendicular to the direction in which the fluid flows.

In an embodiment of the apparatus according to the present invention, the concentration gradient generating unit may include a plurality of distribution microchannels to which first and second flow channels and mixing channels are connected in series.

Figure 5:
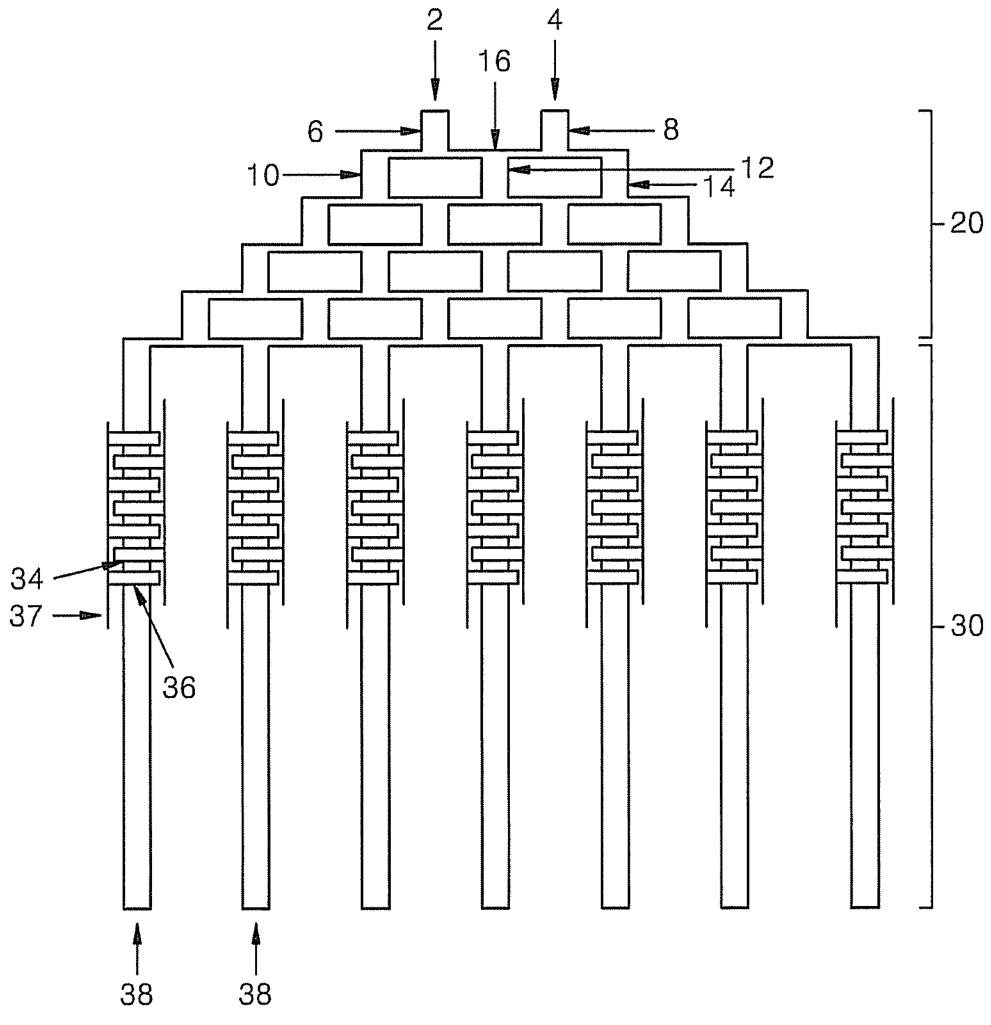
Figure 6A:
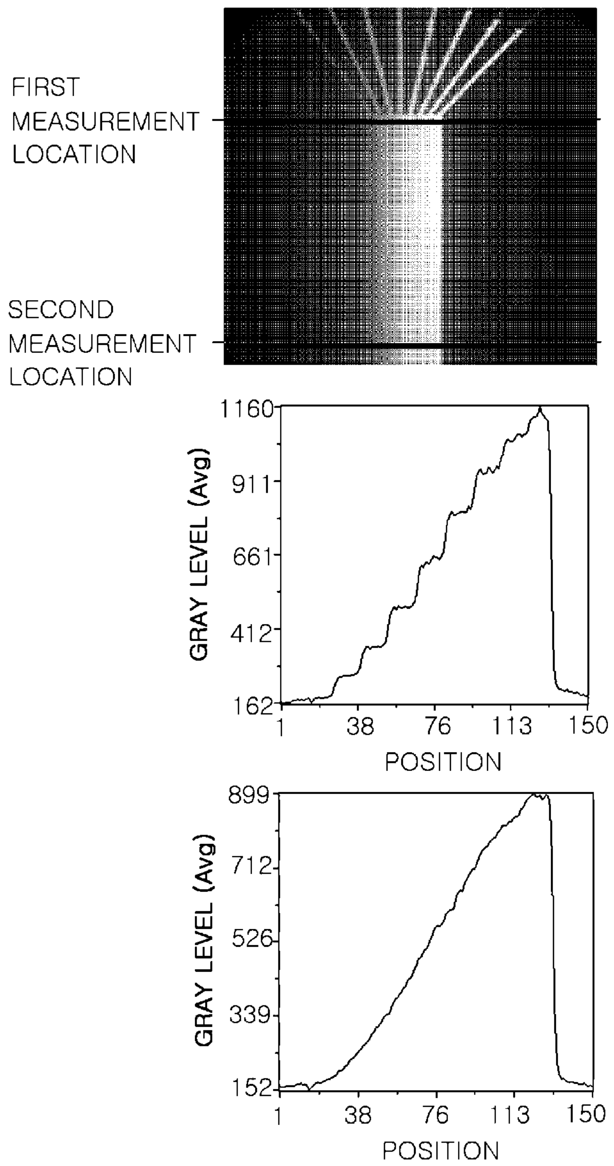
FIGS. 6A-6E are views illustrating the results of a concentration gradient of fluids in a material separating unit after the fluids have passed through the concentration gradient generating unit observed using a fluorescent microscope in an example according to the present invention.
Figure 6B:
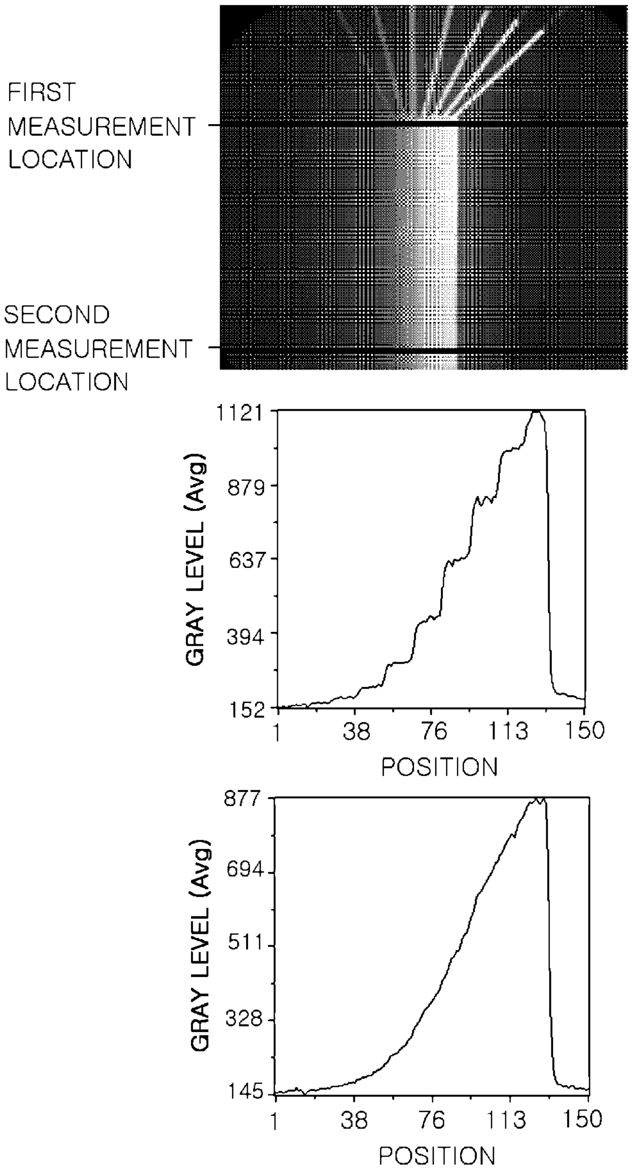
Figure 6C:
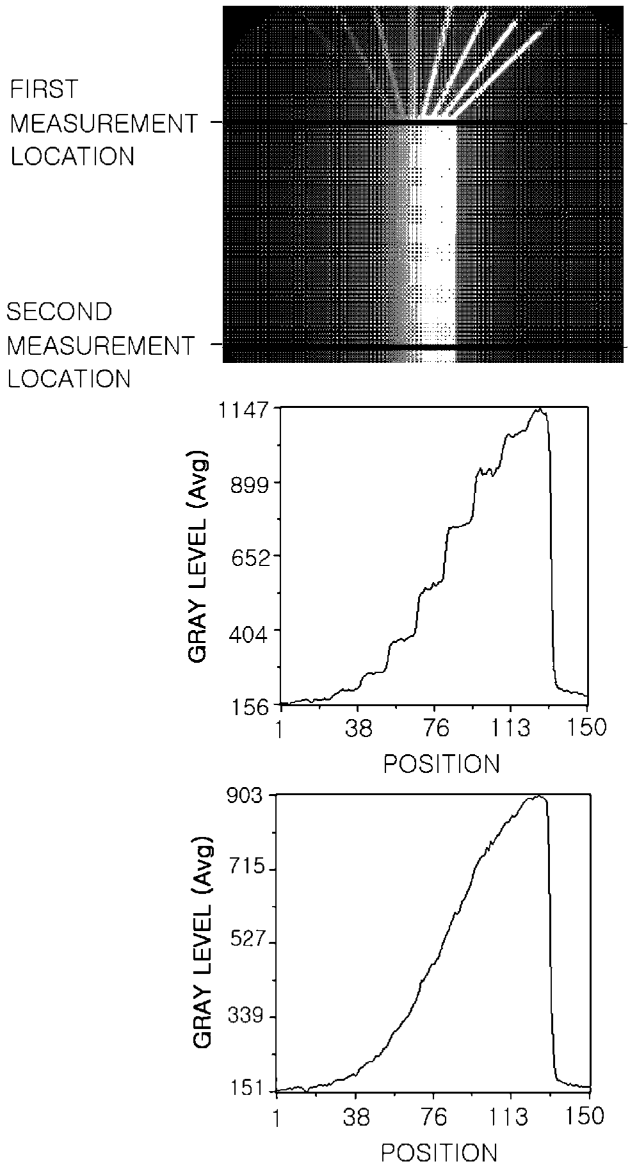
Figure 6D:
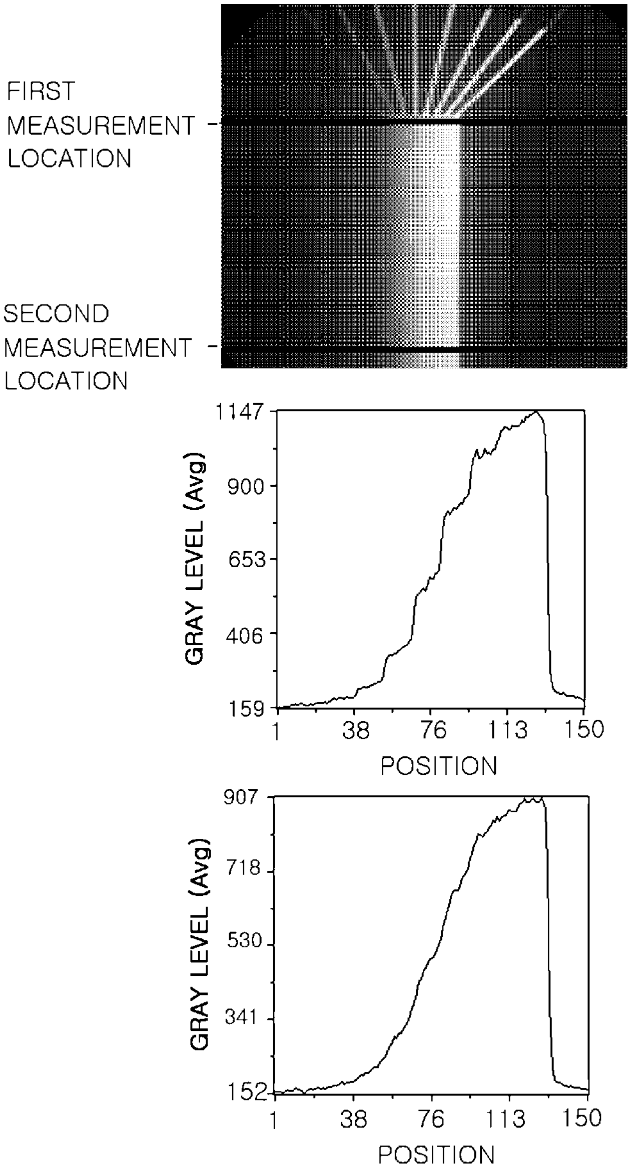
Figure 6E:
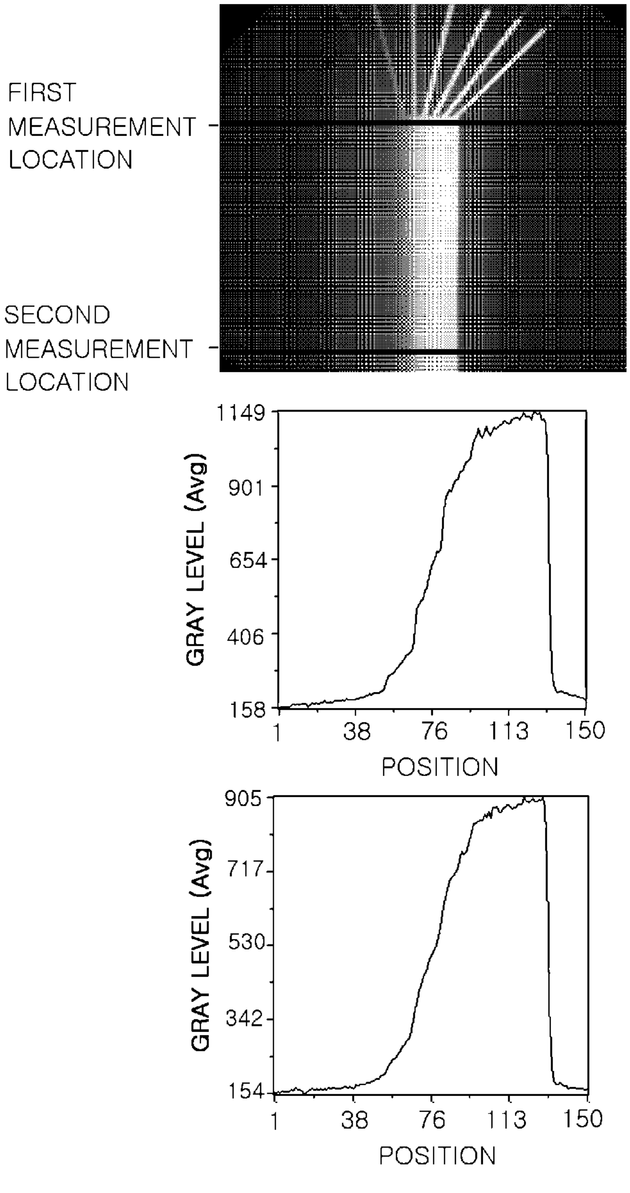

FIG. 5 is a diagram illustrating an apparatus for separating a target material by DEP according to another embodiment of the present invention. Referring to FIG. 5, in a concentration gradient generating unit 20, a first inlet 2 and a second inlet 4 are connected to a distribution channel 16 via injection channels 6 and 8, respectively. Distribution channels 16 are connected by channels, that is, first flow channels 10, mixing channels 12, and second flow channels 14. The concentration gradient generating unit 20 is connected to a material separating unit 30 through channels extending from the distribution channel 16. The material separating unit 30 includes channels extending from the concentration gradient generating unit 20. Each of the channels includes electrodes 34 and 36. The electrodes 34 and 36 are disposed in such a way that a spatially nonhomogeneous electric field can be generated as an alternating voltage is applied between the electrodes 34 and 36. The electrodes 34 and 36 respectively extend from connection taps 37, and are interdigitatedly disposed in parallel to each other.

In another embodiment of the present invention, the apparatus may further include a third inlet and a fourth inlet. In this case, the first and third inlets are connected to the distribution microchannel via channels converging into a single channel to be connected to the distribution microchannel at a single location, and the second and fourth inlets are connected to the distribution microchannel via channels converging into a single channel to be connected to the distribution microchannel at a single location.

In another embodiment of the present invention, the apparatus may further include at least one inlet connected to the distribution microchannel between the mixing channels via a channel.

In another embodiment of the present invention, the apparatus may further include at least two inlets connected to the distribution microchannel via channels converging into a single channel to be connected to the distribution microchannel between the mixing channels.

In another embodiment of the apparatus according to the present invention, the first inlet, or the second inlet, or both the first and second inlets may be connected to the distribution microchannel via microchannel(s) branching off into a plurality of channels to be connected to the distribution microchannel at a plurality of locations.

In another embodiment of the present invention the apparatus may further comprise a detector installed to detect a region of each of the channels of the material separating unit in which the electrodes are installed. The detector is used to detect the target material to be separated in a region in which the electrodes are arranged. The detector may be any signal detector known to one of ordinary skill in the art to which the present invention pertains. For example, the detector may be one selected from the group consisting of a microscope, an optical detector, and a CCD camera. The detector can be arranged in any region of the material separating unit, for example, such as to detect a signal originating from the region in which the electrodes are arranged.

The apparatus for separating a target material in a sample solution according to the present invention includes the concentration gradient generating unit and the material separating unit. The material separating unit includes a plurality of channels each including at least two electrodes. Therefore, the target material contained in the sample solution can be separated by applying AC voltages with different frequencies to the sample solution with different conductances. Thus, the apparatus can be used to determine the optimum conductance and frequency conditions for separating a target material in a sample solution.

The present invention also provides a method of screening an optimum conductance condition for separate a target material in a sample solution by DEP using any one of the apparatuses described in the above embodiment. The method includes: injecting a sample solution containing a target material into at least one inlet and inducing a fluidic flow from the inlets toward the outlet; and generating a spatially nonhomogeneous electric field in the material separating unit by applying an alternating voltage from an alternating power supply between the electrodes in each of the channels of the material separating unit to selectively delay the flow of the target material contained in the sample solution.

In the method according to the present invention, the frequency of the alternating voltage applied to each of the channels of the material separating unit may be the same or different. The target material may be labeled with a detectable labeling material.

In an embodiment of the present invention, the method may further include detecting the location of a channel of the material separating unit in which the target material exists. In this case, the detecting of the location of the channel in which the target material exists may include detecting the location of a channel in which the target material is adsorbed onto the electrodes using the detector and determining the conductance, AC voltage, and frequency in the channel. Alternatively, the detecting of the location of the channel in which the target material exists comprises detecting the location of a channel in which the target material is trapped between the electrodes using the detector and determining the conductance, AC voltage, and frequency in the channel.

In another embodiment, the method according to the present invention may further include discharging the target material from the microchannels in which the target material is selectively adsorbed or trapped. In this case, the optimum conductance, AC voltage and AC voltage frequency conditions for separating the target material are determined using the location of the channel from which the target material is discharged and the conductance, voltage and the frequency of the AC voltage applied to the channel.

The present invention will be described in more detail with reference to the following examples. The following examples are only for illustrative purposes and are not intended to limit the scope of the present invention.

EXAMPLES

Example 1

Generation of Concentration (or Conductance) Gradient

An apparatus which is the same as the apparatus of FIG. 3, except that no electrode is included, was used to investigate whether a concentration gradient was generated after a fluid had passed through a concentration gradient unit. The apparatus included channels each having a diameter about 50 μm and a material separating unit, which was a chamber having an area of 850 μm and a length of 1 cm. Electrodes were disposed in the material separating unit at a regular interval of 15 μm. Whether a concentration gradient was generated was examined using a fluorescence microscope since top substrates of the chamber and the channels were made of transparent PDMS and bottom substrates of the chamber and the channels were made of transparent glass.

First, PBS was injected into a first inlet, and 5 μM of FITC in PBS was injected into a second inlet at a predetermined flow rate using a syringe pump to induce a fluidic flow from the inlet toward an outlet. After three minutes, images were captured at first and second measurement locations using a fluorescent microscope and then the intensity of fluorescence in gray regions were measured from the left to the right.

FIGS. 6A-6E are views illustrating the results of the concentration gradient generating unit generating concentration gradients of fluids in the material separating unit after the fluids have passed through the concentration gradient generating unit observed using a fluorescent microscope. Referring to FIGS. 6A-6E, it is important to choose a flow rate at which uniform gradients are generated over a large region while the laminar flow is maintained. The images in the top row in FIGS. 6A-6E are photographs of the first and second measurement locations taken using the fluorescent microscope. The graphs in the middle and bottom rows in FIGS. 6A-6E are the results of analyzing the images captured at the first and second measurement locations, respectively. The graphs in FIGS. 6A-6E respectively illustrate concentration gradients at a flow rate of 4, 10, 20, 40, and 100 μl/min, respectively.

Figure 7:
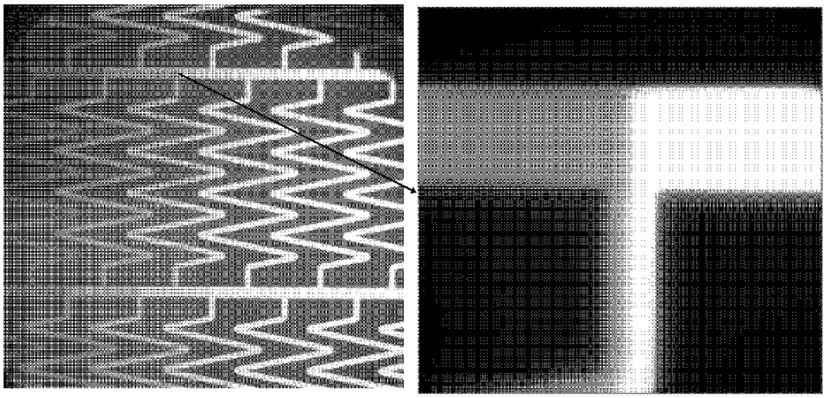
FIG. 7 is photographs taken using a fluorescent microscope, illustrating a laminar flow in a region of a distribution channel of the concentration generating unit connected to mixing channels disposed in a direction in which the fluids flows.

FIG. 7 is photographs taken using a fluorescent microscope, illustrating a laminar flow in a region of a distribution channel of the concentration generating unit connected to mixing channels disposed in a direction in which the fluids flows. Referring to FIG. 7, fluids with different fluorescent concentrations flowing from two adjacent mixing channels form a laminar flow in the distribution channel and flows into another mixing channel connected to the distribution channel between the two adjacent mixing channels.

Example 2

Effect of Time on Separation of Target Material

Figure 8:
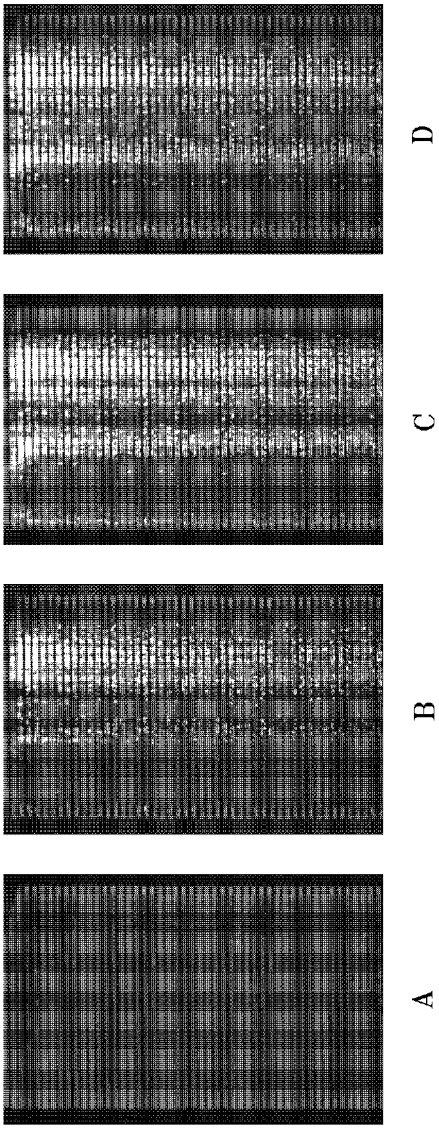
FIG. 8 is photographs illustrating the results of observing a degree of separation of *E. coli* in a material separating unit with respect to time.

An apparatus which was the same as the apparatus used in Example 1 except that it had an electrode structure of FIG. 1 was used. A solution of fluorescent-stained *E. coli* $10^6$ cell/μl having a conductance of 0.804 mS/m and a solution of fluorescent-stained *E. coli* $10^6$ cell/μl having a conductance of 80.9 mS/m, both stained with a cell staining solution (Live/Dead cell kit from Molecular Probe Company) were respectively injected into first and second inlets using a syringe pump to generate a fluidic flow at a flow rate of 10 μl/min. The conductances of the *E. coli* solutions were controlled using a solution of an LB medium diluted with distilled water as a dispersion medium, and NaCl. Then, 7 Vp-p (peak-to-peak voltage) having a frequency of 10 kHz was applied from an alternating voltage power supply between the electrodes of the material separating unit, and the electrodes were photographed inward from the exterior of a chamber at different times using a fluorescent microscope. FIG. 8 is a view illustrating the results of observing a degree of separation of *E. coli* in the material separating unit with respect to time. Referring to FIG. 8, a larger amount of *E. coli* were adhered to the electrodes as the time passes. Also, *E. coli* adhered to the electrodes at a frequency of 10 kHz, indicating that they have positive DEP characteristics. In FIG. 8, images A through D show the degrees of separation of *E. coli* after 0, 10, 20, and 30 minutes, respectively.

Example 3

Effect of Frequency on Separation of Target Material

Figure 9:
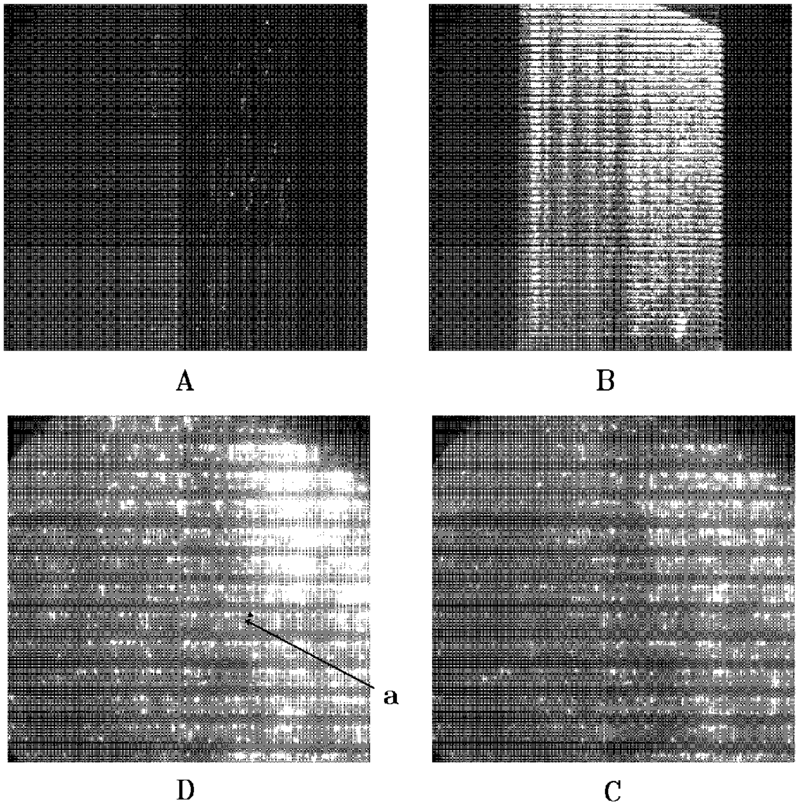
FIG. 9 is photographs illustrating the results of observing a degree of separation of *E. coli* in the material separating unit with respect to frequency.

An apparatus which was the same as the apparatus used in Example 1 except that it had an electrode structure of FIG. 1 was used. A solution of fluorescent-stained *E. coli* $10^6$ cell/μl having a conductance of 0.322 mS/m and a solution of fluorescent-stained *E. coli* $10^6$ cell/μl having a conductance of 81.2 mS/m, both stained using a cell staining solution (Live/Dead cell kit from Molecular Probe Company), were respectively injected into first and second inlets using a syringe pump to generate a fluidic flow at a flow rate of 10 μl/min. The conductances of the *E. coli* solutions were controlled using a solution of an LB medium diluted with distilled water as a dispersion medium, and NaCl. Then, 5 Vp-p having a frequency of 10 kHz was applied from an alternating voltage power supply between the electrodes of the material separating unit for 10 minutes, and 2 Vp-p having a frequency of 10 MHz was applied from the alternating voltage power supply between the electrodes for 1 minute. The electrodes were photographed inward from the exterior of a chamber at different times using a fluorescent microscope. FIG. 9 is a view illustrating the results of a degree of separation of *E. coli* in the material separating unit at different frequencies. Referring to FIG. 9, *E. coli* adhered to the electrodes at a frequency of 10 kHz or higher, indicating that live *E. coli* have positive DEP characteristics. In FIG. 9, images A and B show degrees of separation of *E. coli*, respectively, before a voltage is applied and after a 5 Vp-p having a frequency of 10 kHz is applied for 10 minutes. An image C is an enlargement of the image B, and an image D shows a degree of separation of *E. coli* after a 2 Vp-p having a frequency of 10 MHz is applied for 1 minute. A pearl chain effect appears in the image D, in which spaces between the electrodes seem to be connected due to a lot of *E. coli* adhering to the electrodes.

Example 4

Effect of Conductance of Medium on Separation of Target Material

An apparatus which was the same as the apparatus used in Example 1 except that it had an electrode structure of FIG. 1 was used. A solution of fluorescent-stained *E. coli* $10^4$ cell/μl having a conductance of 0.388 mS/m and a solution of fluorescent-stained *E. coli* $10^4$ cell/μl having a conductance of 302 mS/m, both stained using a cell staining solution (Live/Dead cell kit from Molecular Probe Company), were respectively injected into first and second inlets using a syringe pump to generate a fluidic flow at a flow rate of 10 μl/min. The conductances of the *E. coli* solutions were controlled using a solution of an LB medium diluted with distilled water as a dispersion medium, and NaCl. Then, a 5 Vp-p having a frequency of 1 MHz was applied from an alternating voltage power supply between the electrodes of the material separating unit for 10 minutes, and the electrodes were photographed inward from the exterior of a chamber using a fluorescent microscope. Likewise, a solution of fluorescent-stained *E. coli* $10^4$ cell/μl having a conductance of 0.9 mS/m and a solution of fluorescent-stained *E. coli* $10^4$ cell/μl having a conductance of 1 S/m were respectively injected into the first and second inlets using a syringe pump to generate a fluidic flow at a flow rate of 10 μl/min. Then, a 2 Vp-p having a frequency of 10 MHz was applied from the alternating voltage power supply between the electrodes of the material separating unit for 10 minutes, and the electrodes were photographed inward from the exterior of a chamber using the fluorescent microscope.

Figure 10:
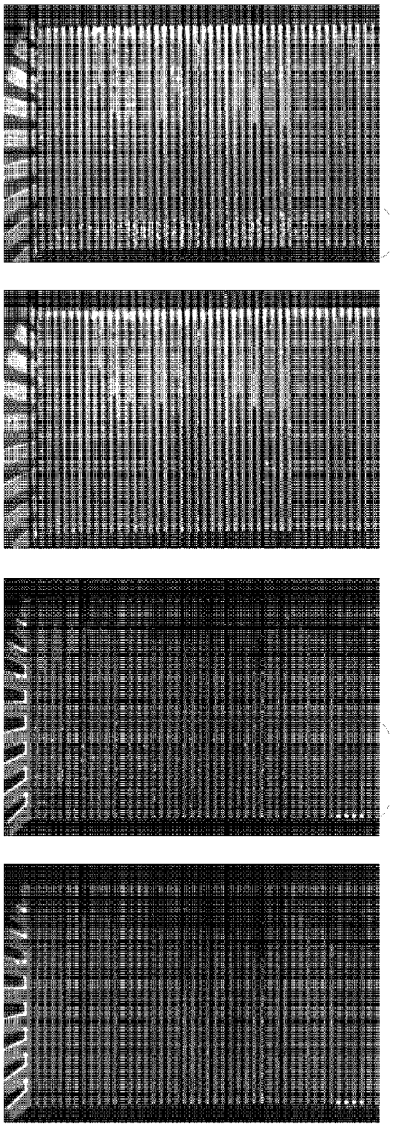
FIG. 10 is photographs illustrating the results of observing a degree of separation of *E. coli* in the material separating unit with respect to conductance.

FIG. 10 is a view illustrating the results of observing a degree of separation of *E. coli* in the material separating unit with respect to conductance. Referring to FIG. 10, *E. coli* were adhered to the electrodes at a conductance of about 150 mS/m or less regardless of the area of a given conductance gradient. Consequently, it was found that *E. coli* can be easily separated at a conductance of about 150 mS/s or less when a 2-5 Vp-p having a frequency of 1-10 MHz, as indicated by rectangles in FIG. 10. For reference, at a conductance of about 150 mS/m or greater, *E. coli* showed negative DEP characteristics and were moved in a direction away from the electrodes and discharged through the outlet by the fluidic flow. As a result, *E. coli* were not observed using the fluorescent microscope, as shown in areas not surrounded by the rectangles in FIG. 10. In FIG. 10, images A and B were taken after a 5 Vp-p having a frequency of 1 MHz was applied between the electrodes for 0 and 10 minutes, respectively, at a conductance gradient of 0.388-302 mS/m. In FIG. 10, images C and D were taken after a 2 Vp-p having a frequency of 10 MHz was applied between the electrodes for 0 and 10 minutes, respectively, at a conductance gradient of 0.9 mS/m-1 S/m.

Example 5

Effect of Conductance of Medium of Separation of Target Material

It was observed from the results of Examples 2 through 4 that the live *E. coli* have positive DEP characteristics at a certain conductance when a 2 Vp-p having a frequency of 10 kHz is applied. That is, *E. coli* were adhered to the electrodes under the above-described conditions.

In the present example, a conductance gradient was generated at 2 Vp-p, and dead *E. coli* were separated at different frequencies using an apparatus according to the present invention. An apparatus which was the same as the apparatus used in Example 1 except that it had an electrode structure of FIG. 1 was used. A solution of fluorescent-stained dead *E. coli* $10^4$ cell/μl having a conductance of 0.394 mS/m and a solution of fluorescent-stained dead *E. coli* $10^4$ cell/μl having a conductance of 298 mS/m, both stained using a cell staining solution (Live/Dead cell kit from Molecular Probe Company), were respectively injected into the first and second inlets using a syringe pump to generate a fluidic flow at a flow rate of 10 μl/min. The conductances of the *E. coli* solutions were controlled using a solution of an LB medium diluted with distilled water as a dispersion medium, and NaCl. Then, a 2 Vp-p having a frequency of 1 kHz to 15 MHz (8 experiments at 8 different frequencies) was applied from an alternating voltage power supply between the electrodes of the material separating unit for 10 minutes, and the electrodes were photographed inward from the exterior of a chamber using a fluorescent microscope.

Figure 11:
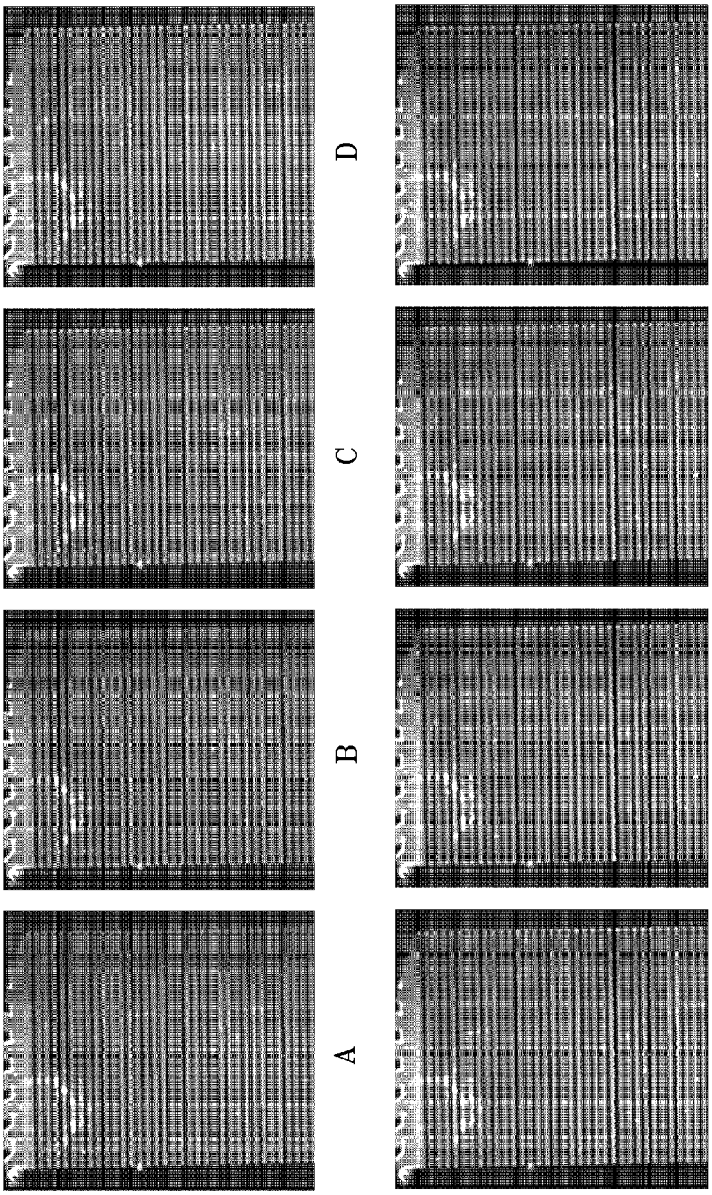
FIG. 11 is photographs illustrating the results of separating dead *E. coli* at a conductance gradient of 0.394-298 mS/m, 2 Vp-p, and different frequencies.

FIG. 11 is a view illustrating the results of separating dead *E. coli* at a 2 Vp-p having various frequencies and a conductance gradient of 0.394-298 mS/m. Referring to FIG. 11, no dead *E. coli* was adhered to the electrodes regardless of the conductance and frequency at 2 Vp-p, and the dead *E. coli* were completely discharged. In FIG. 11, images A through H show the results at frequencies of 1, 10, 100, 1,000, 2,000, 5,000, 10,000, and 15,000 kHz, respectively.

As described in the examples, live *E. coli* can be separated from dead *E. coli* by DEP at a 2 Vp-p having a frequency of 10 kHz or greater and a conductance of about 150 mS/m or lower.

As described above, an apparatus for separating a target material contained in a sample solution according to the present invention includes a concentration gradient generating unit and a material separating unit and thus can be used to separate a target material from a sample solution containing a target material through a single operation. Thus, the apparatus is useful in screening the optimum conductance for separating a target material.

In a method of screening the conditions for separating a target material contained in a sample solution by DEP using the apparatus according to the present invention, the conditions at which the target material can be efficiently separated from the sample solution can be screened at various concentrations gradient of the target material.

In a method of separating a target material contained in a sample solution by DEP using the apparatus of the present invention, the condition for separating the target material can be determined, and simultaneously the target material cab be separated.

In an apparatus for separating a target material contained in a sample solution according to the present invention, a plurality of electrodes are installed in a channel through which a sample solution with different conductances flows, so shat the target material can be separated at different AC voltage and AC frequencies. Thus, the apparatus is useful in determining the optimum condition, including optimum conductance and the optimum AC frequency for separating the target material.

According to a method of screening the condition for separating a target material in a sample solution by DEP using the apparatus of the present invention, the conditions, including optimum conductance and frequency conditions at which the target material can be efficiently separated from the sample solution can be screened at various concentrations gradient of the target material.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of screening a condition for separating a target material from a sample solution by dielectrophoresis using an apparatus for separating a material or screening a material separating condition by dielectrophoresis, the method comprising:

injecting the sample solution containing the target material into at least one inlet and inducing a fluidic flow from the inlet toward an outlet to generate a concentration gradient in a direction substantially perpendicular to a direction in which the fluid flows, in a material separating unit;

generating a spatially nonhomogeneous electric field in the material separating unit by applying an alternating voltage from an alternating power supply between a plurality of electrodes to selectively delay the flow of the target material in the sample solution; and detecting the location of the target material which is flow-delayed using a detector wherein the apparatus comprises:

a concentration gradient generating unit formed of a microchannel network;

the material separating unit which is connected to the concentration gradient generating unit and includes the plurality of electrodes;

first and second inlets connected to the concentration gradient generating unit;

the outlet connected to the material separating unit; and an element for inducing the fluidic flow between the first and second inlets, and the outlet, wherein the concentration gradient generating unit comprises:

microchannels connected to the first and second inlets, the microchannels including first and second injection microchannels, a distribution microchannel, first and second flow channels, and at least one mixing channel, wherein the first and second injection microchannels respectively connect the first and second inlets to the distribution microchannel, the first injection microchannel is connected to the distribution microchannel between the first flow channel and a mixing channel nearest to the first flow channel, the second injection microchannel is connected to the distribution microchannel between the second flow channel and a mixing channel nearest to the second flow channel, the distribution microchannel is arranged substantially perpendicular to the direction in which the fluid flows, the first and second flow channels are connected to the distribution microchannel, fluids injected through the first and second inlets flow through the first and second flow channels, respectively, not to be mixed together, the mixing channel is connected to the distribution microchannel, and the fluids injected through the first and second inlets are mixed in the mixing channel, and wherein the material separating unit is a chamber comprising:

the first and second flow channels and the mixing channel of the concentration gradient generating unit converged at a single inlet of a single channel;

at least two electrodes, an element for supplying alternating current to the electrodes, and the detector, wherein the electrodes generate the spatially nonhomogeneous electric field in the chamber when the alternating current is supplied between the electrodes, thereby separating the target material from the sample solution by dielectrophoresis when the target material passes the electrodes.

2. The method of claim 1, wherein the target material is labeled with a detectable labeling material.

3. The method of claim 1, wherein the detecting of the location of the target material comprises determining the conductance, AC voltage, and frequency in a region in which the target material is adsorbed onto the electrodes.

4. The method of claim 1, wherein the detecting of the location of the target material comprises determining the conductance, AC voltage, and frequency in a region in which the target material is trapped between the electrodes.

5. A method of separating a target material in a sample solution by dielectrophoresis using an apparatus for separating a material or screening a material separating condition by dielectrophoresis, the method comprising:

injecting the sample solution containing the target material into at least one inlet and inducing a fluidic flow from the inlet toward an outlet to generate a concentration gradient in a direction substantially perpendicular to a direction in which the fluid flows, in a material separating unit;

generating a spatially nonhomogeneous electric field in the material separating unit by applying an alternating voltage from an alternating power supply between a plurality of electrodes to selectively delay the flow of the target material in the sample solution; and discharging the target material which is flow-delayed, thereby separating the target material from the sample solution, wherein the apparatus comprises:

a concentration gradient generating unit formed of a micro channel network;

the material separating unit which is connected to the concentration gradient generating unit and includes the plurality of electrodes;

first and second inlets connected to the concentration gradient generating unit;

the outlet connected to the material separating unit; and an element for inducing the fluidic flow between the first and second inlets, and the outlet, wherein the concentration gradient generating unit comprises:

microchannels connected to the first and second inlets, the microchannels including first and second injection microchannels, a distribution microchannel, first and second flow channels, and at least one mixing channel, wherein the first and second injection microchannels respectively connect the first and second inlets to the distribution microchannel, the first injection microchannel is connected to the distribution microchannel between the first flow channel and a mixing channel nearest to the first flow channel, the second injection microchannel is connected to the distribution microchannel between the second flow channel and a mixing channel nearest to the second flow channel, the distribution microchannel is arranged substantially perpendicular to the direction in which the fluid flows, the first and second flow channels are connected to the distribution microchannel, fluids injected through the first and second inlets flow through the first and second flow channels, respectively, not to be mixed together, the mixing channel is connected to the distribution microchannel, and the fluids injected through the first and second inlets are mixed in the mixing channel, and the material separating unit is a chamber comprising:

the first and second flow channels and the mixing channel of the concentration gradient generating unit converged at a single inlet of a single channel;

at least two electrodes, an element for supplying alternating current to the electrodes, and a detector, wherein the electrodes generate the spatially nonhomogeneous electric field in the chamber when the alternating current is supplied between the electrodes, thereby separating the target material from the sample solution by dielectrophoresis when the target material passes the electrodes.

6. A method of separating a target material in a sample solution by dielectrophoresis using the apparatus for separating a material or screening a material separating condition by dielectrophoresis, the apparatus comprising:

wherein a material separating condition preset by the method of claim 1 is used.

7. The method of claim 6, wherein the target material is labeled with a detectable labeling material.

8. A method of screening a condition for separating a target material in a sample solution by dielectrophoresis using an apparatus for separating a material or screening a material separating condition by dielectrophoresis, the method comprising:

injecting the sample solution into at least one inlet and inducing a fluidic flow from the inlet toward an outlet; and generating a spatially nonhomogeneous electric field in a material separating unit by applying an alternating voltage from an alternating power supply between a plurality of electrodes in each of a plurality of microchannels of the material separating unit, to selectively delay the flow of the target material contained in the sample solution, wherein the apparatus comprises:

a concentration gradient generating unit formed of a microchannel network;

the material separating unit comprising the plurality of microchannels connected to the concentration gradient generating unit, and the plurality of electrodes;

first and second inlets connected to the concentration gradient generating unit;

the outlet connected to the material separating unit; and an element for inducing thea fluidic flow between the first and second inlets, and the outlet, wherein the concentration gradient generating unit comprises:

microchannels connected to the first and second inlets, the microchannels including first and second injection microchannels, a distribution microchannel, first and second flow channels, and at least one mixing channel, wherein the first and second injection microchannels respectively connect the first and second inlets to the distribution microchannel, the first injection microchannel is connected to the distribution microchannel between the first flow channel and a mixing channel nearest to the first flow channel, the second injection microchannel is connected to the distribution microchannel between the second flow channel and a mixing channel nearest to the second flow channel, the distribution microchannel is arranged substantially perpendicular to a direction in which a fluid flows, the first and second flow channels are connected to the distribution microchannel, fluids injected through the first and second inlets flow through the first and second flow channels, respectively, not to be mixed together, the mixing channel is connected to the distribution microchannel, and the fluids injected through the first and second inlets are mixed in the mixing channel, and the material separating unit comprises:

a microchannel extending from each of the first and second flow channels and the mixing channel; and at least two electrodes in each of the microchannels; and an element for supplying alternating current to the electrodes, wherein the electrodes generate the spatially nonhomogeneous electric field in each of the microchannels when the alternating current is supplied between the electrodes, thereby separating the target material from the sample solution by dielectrophoresis.

9. The method of claim 8, wherein the frequency of the alternating voltage applied to each of the channels of the material separating unit is the same or different.

10. The method of claim 8, wherein the target material is labeled with a detectable labeling material.

11. The method of claim 9, further comprising detecting the location of a channel of the material separating unit in which the target material exists.

12. The method of claim 11, wherein the detecting of the location of the channel in which the target material exists comprises detecting the location of a channel in which the target material is adsorbed onto the electrodes using the detector and determining the conductance, AC voltage, and frequency applied in the microchannel.

13. The method of claim 11, wherein the detecting of the location of the channel in which the target material exists comprises detecting the location of a channel in which the target material is trapped between the electrodes using the detector and determining the conductance, AC voltage, and frequency applied in the channel.

14. The method of claim 11, wherein the detecting of the location of the channel in which the target material exists comprises:

discharging the target material from the microchannels in which the target material is selectively adsorbed or trapped;

detecting the location of the specific microchannel in which the target material is discharged; and determining the conductance, AC voltage, and frequency applied in the microchannel.

* * * * *